US011010722B2

(12) United States Patent
Castelli et al.

(10) Patent No.: US 11,010,722 B2
(45) Date of Patent: May 18, 2021

(54) PERSONALIZED SCHEDULING AND NETWORKING SYSTEM, METHOD, AND RECORDING MEDIUM

(71) Applicant: International Business Machines Corporation, Armonk, NY (US)

(72) Inventors: Vittorio Castelli, Croton on Hudson, NY (US); Georgiana Dinu, White Plains, NY (US); Radu Florian, Danbury, CT (US); Gourab Kundu, White Plains, NY (US); Taesun Moon, Scarsdale, NY (US); Avirup Sil, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 439 days.

(21) Appl. No.: 14/970,003

(22) Filed: Dec. 15, 2015

(65) Prior Publication Data
US 2017/0169397 A1 Jun. 15, 2017

(51) Int. Cl.
| *G06Q 10/10* | (2012.01) |
| *H04L 29/08* | (2006.01) |
| *H04W 4/024* | (2018.01) |
| *H04W 4/029* | (2018.01) |
| *H04W 4/02* | (2018.01) |

(52) U.S. Cl.
CPC ......... *G06Q 10/1095* (2013.01); *H04L 67/22* (2013.01); *H04W 4/024* (2018.02); *H04W 4/029* (2018.02); *H04L 67/18* (2013.01); *H04W 4/02* (2013.01)

(58) Field of Classification Search
CPC .................................................. G06Q 10/1095
See application file for complete search history.

(56) References Cited

U.S. PATENT DOCUMENTS

| 8,700,540 | B1 * | 4/2014 | Zambrano | G06F 16/24578 |
| | | | | 705/319 |
| 2002/0168084 | A1 * | 11/2002 | Trajkovic | G06Q 30/02 |
| | | | | 382/100 |
| 2006/0288010 | A1 * | 12/2006 | Chen | G06Q 30/02 |
| 2011/0087426 | A1 * | 4/2011 | Feng | G01C 21/343 |
| | | | | 701/532 |

(Continued)

OTHER PUBLICATIONS

Gao, Tang, Hu, Liu, Exploring Temporal Effects for Location Recommendation on Location-Based Social Networks, Oct. 2013, Proceeding of the 7th ACM conference on Recommender Systems, 93-100 (Year: 2013).*

*Primary Examiner* — Hafiz A Kassim
*Assistant Examiner* — Zahra Elkassabgi
(74) *Attorney, Agent, or Firm* — Anthony Curro, Esq.; McGinn IP Law Group, PLLC

(57) ABSTRACT

A personalized scheduling and networking method, system, and non-transitory computer readable medium include creating a user persona profile based on user information, extracting scheduling and networking information based on event information, matching a user with events during a conference based on the extracted scheduling and networking information and the user persona profile, and creating a schedule and a route for maximizing a number of the events and networking opportunities based on matches of the matching.

19 Claims, 5 Drawing Sheets

(56) References Cited

U.S. PATENT DOCUMENTS

2014/0074536 A1\* 3/2014 Meushar ............ G06Q 10/1095
    705/7.19
2014/0179354 A1\* 6/2014 Fisher ..................... H04W 4/02
    455/456.3
2016/0342952 A1\* 11/2016 Yasuda .............. G06Q 10/1095

\* cited by examiner

PERSONALIZED SCHEDULING AND NETWORKING SYSTEM, METHOD, AND RECORDING MEDIUM

BACKGROUND

The present invention relates generally to a personalized scheduling and networking system, and more particularly, but not by way of limitation, to a personalized scheduling and networking system for automatically creating a schedule or a route based on user preferences either manually collected or automatically gathered using social media, where the schedule includes networking opportunities.

Conventionally, networking systems for events have manually created a schedule for a small event. However, manual creation becomes difficult for large events and last minute changes also can wreak havoc with a manually created schedule along with manually identifying participants to the event and trying to schedule meetings or networking opportunities.

Other conventional techniques includes scheduling applications that build schedules or routes based on manually specified constraints. But these applications do not match user preferences with available events nor schedule and automatically identify opportunities for networking.

That is, the conventional techniques do not account for large events, cancelled schedules, dynamic user schedules, etc. in creating a schedule for users at such events.

Thus, there is a technical problem in the conventional techniques that the techniques are incapable of providing a personalized scheduling and networking system that can dynamically change based on real-time data and be based on user information mined from user profiles.

SUMMARY

In an exemplary embodiment, the present invention can provide a non-transitory computer-readable recording medium recording a personalized scheduling and networking program, the program causing a computer to perform creating a user persona profile based on user information, extracting scheduling and networking information based on event information, matching a user with events during a conference based on the extracted scheduling and networking information and the user persona profile, and creating a schedule and a route for maximizing a number of the events and networking opportunities based on matches of the matching.

Further, in another exemplary embodiment, the present invention can provide a personalized scheduling and networking method, including creating a user persona profile based on user information, extracting scheduling and networking information based on event information, matching a user with events during a conference based on the extracted scheduling and networking information and the user persona profile, and creating a schedule and a route for maximizing a number of the events and networking opportunities based on matches of the matching.

Even further, in another exemplary embodiment, the present invention can provide a personalized scheduling and networking system, including a persona detection device configures to create a user persona profile based on user information, an extraction device configured to extract scheduling and networking information based on event information, a matching device configured to match a user with events during a conference based on the extracted scheduling and networking information and the user persona profile, and a scheduling device configured to create a schedule and a route for maximizing a number of the events and networking opportunities based on matches of the matching device.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
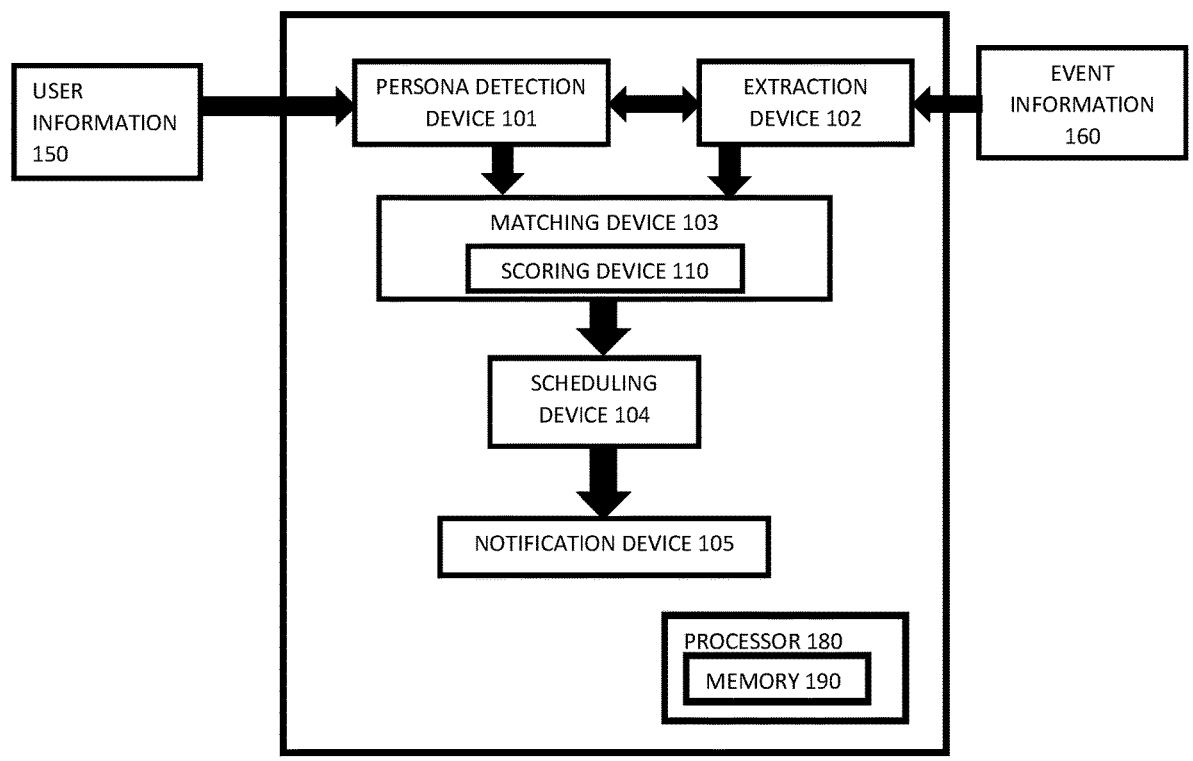
FIG. 1 exemplarily shows a block diagram illustrating a configuration of a personalized scheduling and networking system 100.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the personalized scheduling and networking system 100 includes a persona detection device 101, an extraction device 102, a matching device 103, a scheduling device 104, and a notification device 105. The personalized scheduling and networking system 100 includes a processor 180 and a memory 190, with the memory 190 storing instructions to cause the processor 180 to execute each device of personalized scheduling and networking system 100.

Although the personalized scheduling and networking system 100 includes various devices, it should be noted that a personalized scheduling and networking system can include modules in which the memory 190 stores instructions to cause the processor 180 to execute each module of personalized scheduling and networking system 100.

With the use of these various devices, the personalized scheduling and networking system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Figure 3:
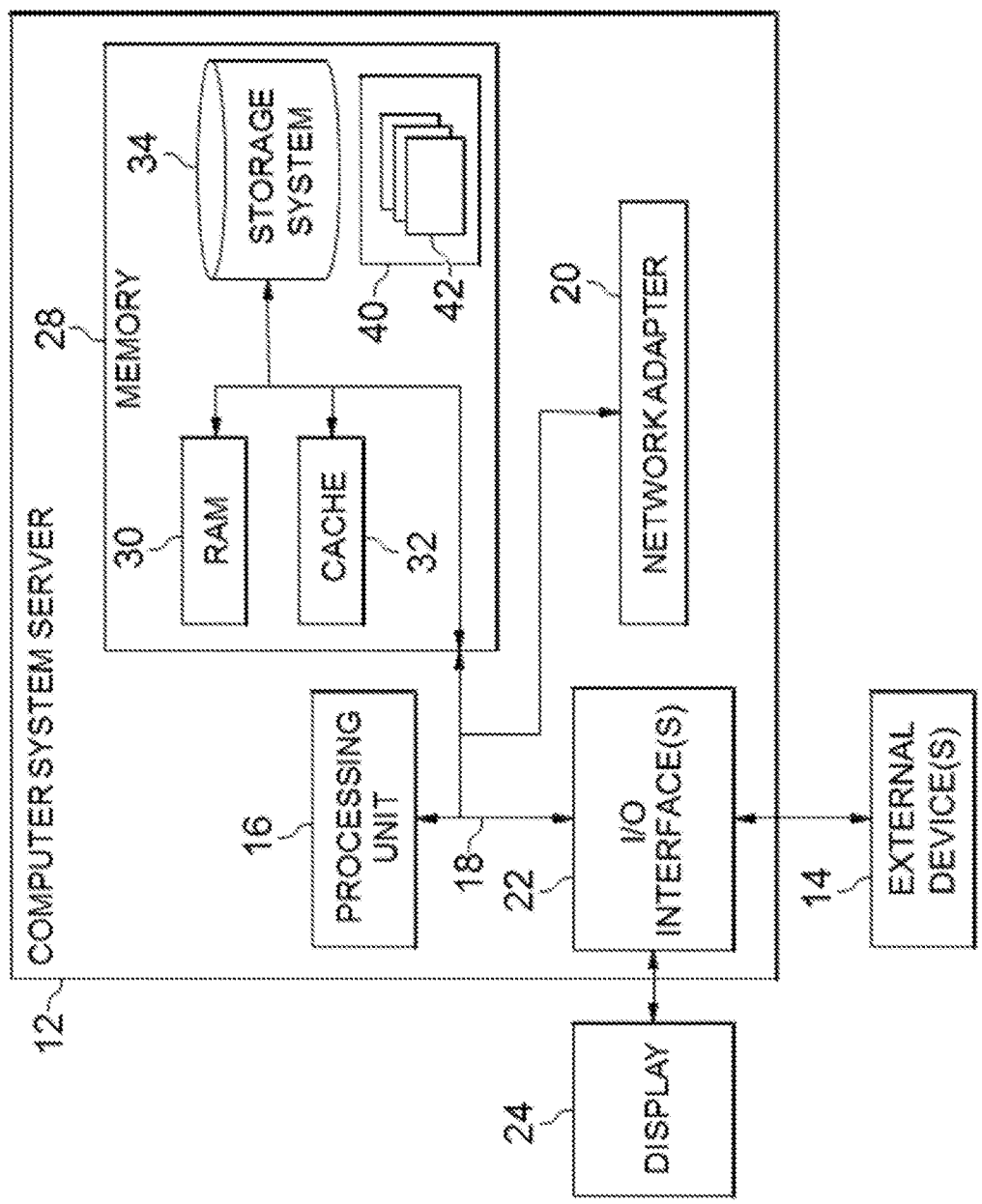
FIG. 3 depicts a cloud computing node according to an embodiment of the present invention.
Figure 4:
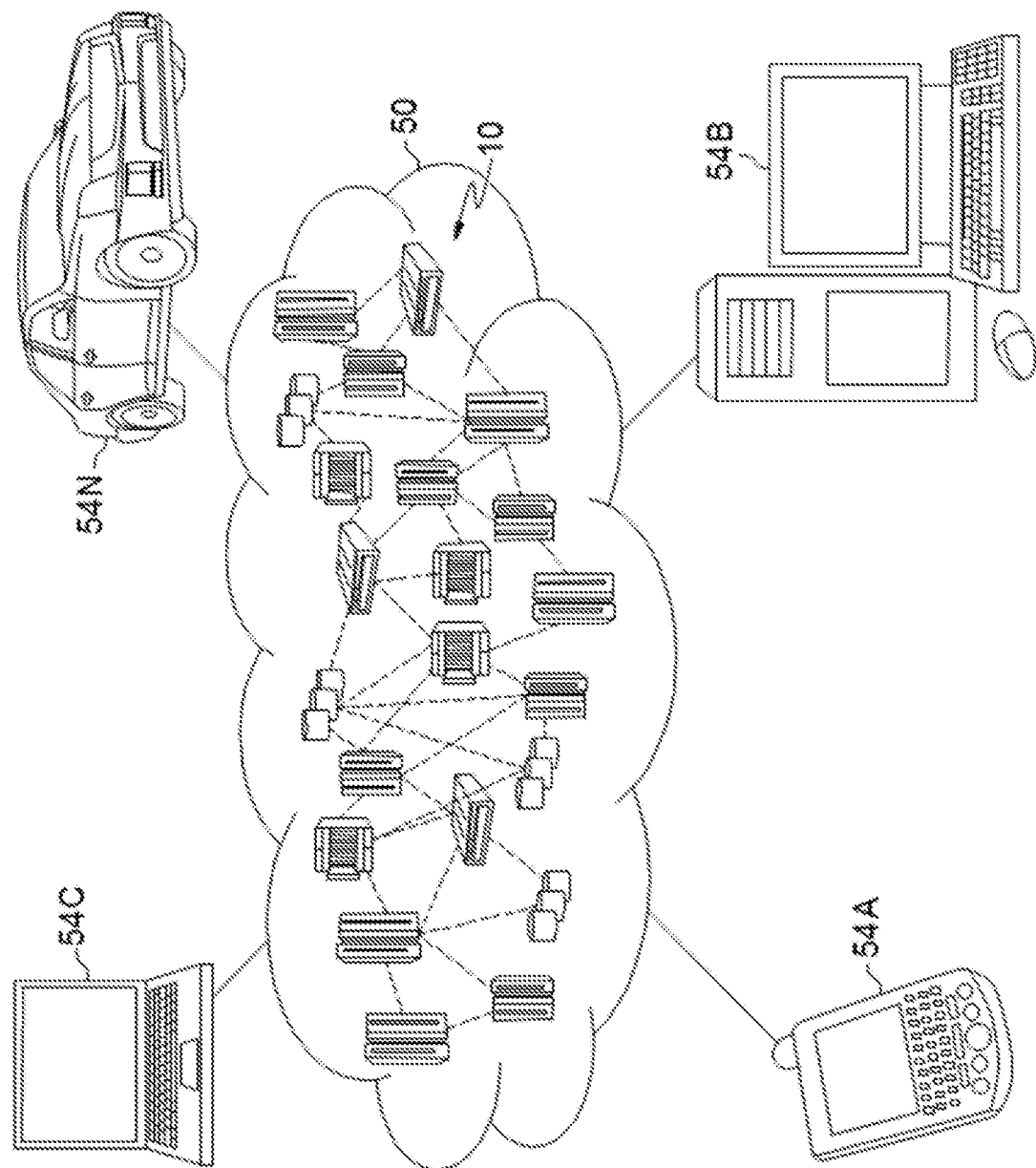
FIG. 4 depicts a cloud computing environment according to another embodiment of the present invention.
Figure 5:
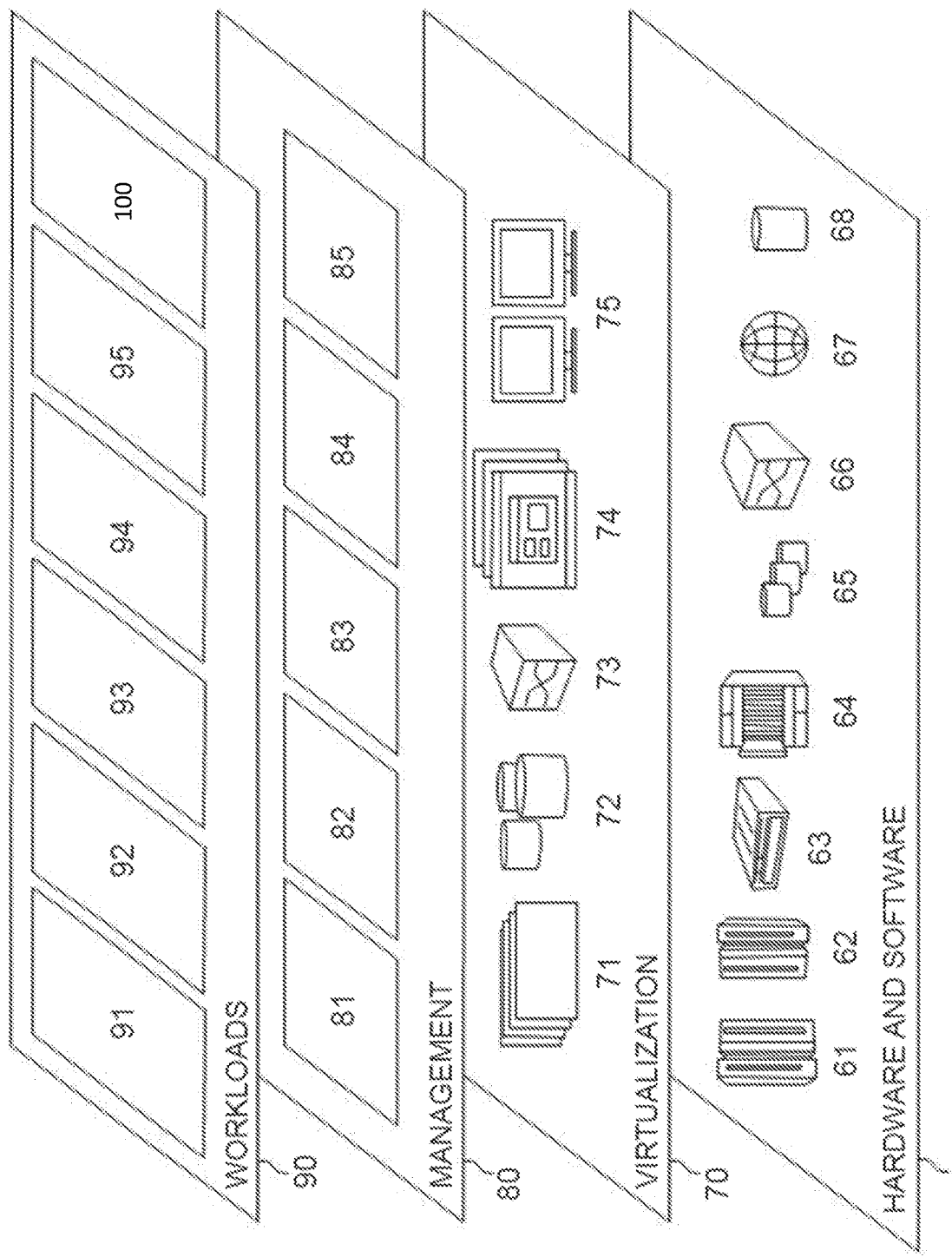
FIG. 5 depicts abstraction model layers according to an embodiment of the present invention.

Although as shown in FIGS. 3-5 and as described later, the computer system/server 12 is exemplarily shown in cloud computing node 10 as a general-purpose computing device which may execute in a layer the personalized scheduling and networking system 100 (FIG. 5), it is noted that the present invention can be implemented outside of the cloud environment.

The personal detection device 101 receives user information 150 and creates a user persona for an event that is specific to that particular event. For example, each participant of an event can create an account with social media information (e.g. an account for Twitter™, Facebook™, a personal homepage, etc.).

The persona detection device 101 mines/gathers all of the users information 150 from these sources and creates a user persona profile based on the available information for that user from these sources, as well as from other sources (e.g., dblp, Google Scholar™, company website) and extracts keywords, likes or dislikes to create a user persona. The user can also manually enter the user information 150 when registering for an event.

The extraction device 102 receives event information 160 and extracts all information pertaining to the types of events, the list of participants, the dates, times, location of events, etc. That is, the extraction device 102 extracts all relevant information in order to create a schedule and network from the event information 160. The event information 160 includes temporal and spatial information about the event. In this manner, the personalized scheduling and networking system 100 will not attempt to network two users if they are a particular distance apart at the event based on the extracted spatial information by the extraction device 102. Thus, the extraction device 102 extracts all information pertaining to scheduling and networking in order to build a schedule as later described.

The event information 160 includes each sub-event having a description (for example, abstract of talks, full proceedings, or promotional material for a new product), keywords, time and location in the schedule. The event information 160 further includes a map of the event along with schedules of sub-events, locations of the sub-events, descriptions of the sub-events, schedules of attendees, locations of the attendees, and descriptions of the attendees. That is, schedules are typically online and last-minute updates are posted on the event web-site, vendors typically have links to their web site in the conference online schedule. The extraction device 102 receives the event information 160 and automatically extracts salient features from the sub-event information available from the event website, online material related to the event, and the websites linked to the sub-event page(s).

Also, a user can add an event to the event information 160. In this manner, once the user signs up for the event, the user has the ability to change the schedule such that all other users will extract the new user-created event using the extraction device 102.

Further, the persona detection device 101 creates the user data that is relevant to the specific context based on the event information extracted by the extraction device 102. Thus, there is a feed of data between the persona detection device 101 and extraction device 102 such that a specific context user persona can be created for an event. For example, if a neurosurgeon who likes to sail competitively as a hobby attends a conference and exposition on robotic brain surgery, the persona detection device 101 creates a profile that contains only professional information on the surgeon and does not include information about boating. However, if the same person is attending the US. Sailboat Show, the user persona will contain little to no professional (i.e., directed to him being a neurosurgeon) information.

The matching device 103 matches the user persona profile with events based on the extracted information and the user's interest. The matching device includes a scoring device 110 that, for each participant, calculates a score for each sub-event, for example based on semantic similarity features derived from the user persona profile and the event information. Based on the score calculated by the scoring device 110, the matching device 103 will match the user with a particular event having the highest score. In this manner, the user will receive an optimized list of matches.

Based on the matches output from the matching device 103, the scheduling device 104 creates a schedule for the user for the event. The scheduling device 104 constructs a personalized schedule for the user, using scheduling and optimization techniques, where such schedule will respect explicit user's directions (e.g., the user wants to attend a certain talk) and will select a subset of events that will maximize the sum of the scores and matches of the matching device 103 and the scoring device 110 subject to the time and location constraints and calculate a schedule and route to attend the set of sub-events and display it to the user. In other words, the scheduling device 104 takes into account temporal and spatial aspects of an event, thereby to create the schedule in addition to the matches and scores.

The scheduling device 104 also automatically adapts the schedule based on contingent information. For example, suppose a person wants to visit a certain pavilion at a World Expo. The waiting time for visiting that pavilion can vary dramatically, and the scheduling application can dynamically adapt the schedule depending on the current and expected waiting time. Thus, the scheduling device 104 generates the schedule in real-time so as to account for last minute changes and abrupt networking opportunities.

Further, the scheduling device 104 can schedule networking times to network with other users at the event. That is, the scheduling device 104 selects appropriate times to schedule a networking opportunity based on the user's schedule and on the schedule of candidate participants. For example, the scheduling device 104 detects times that the user can dedicate to networking with limited negative impact to other user's activities at the event, and match them to similar "free" times for other people with whom the user might want to network. The user can input into the scheduling device how to identify networking events scheduled by other participants that might be of interest to the user. In this manner, the scheduling device 104 can prioritize networking over attending an event based on the user's desires. Since the scheduling device 104 accounts for the spatial aspect of the users in the system, even if an event has not been cancelled but a user is presented with a potential networking opportunity (i.e., with a second user) happens to be within a particular distance of the user, the scheduling device 104 can create the networking opportunity.

It should be noted that the user can specify to the scheduling device 104 the amount of networking versus attending events that the user would like to do. For example, the user can specify that they would like to network the entire event without attending any of the scheduled events.

Based on a user's location, interest and schedule, the notification device 105 will detect other people with similar interests, availability and proximity in locations and propose networking interactions (i.e., notify the user of potential events and networking opportunities). The notification device 105 notifies the user of the networking opportunities in advance as well as how to take advantage of contingent and contextual information to quickly organize networking opportunities. For example, a conference where a paper presentation is cancelled because the author cannot present may be announced at the start of the presentation, and a result of the cancellation might provide a sudden window of opportunity for networking: other people who were interested in attending the talk have matching interests to those of the user, and might be available to networks since the talk is no longer being delivered.

The notification device 105 notifies the users of networking opportunities based on a change in the scheduling and networking information such that the user is aware of new networking opportunities causes by last minute changes in the schedule.

Figure 2:
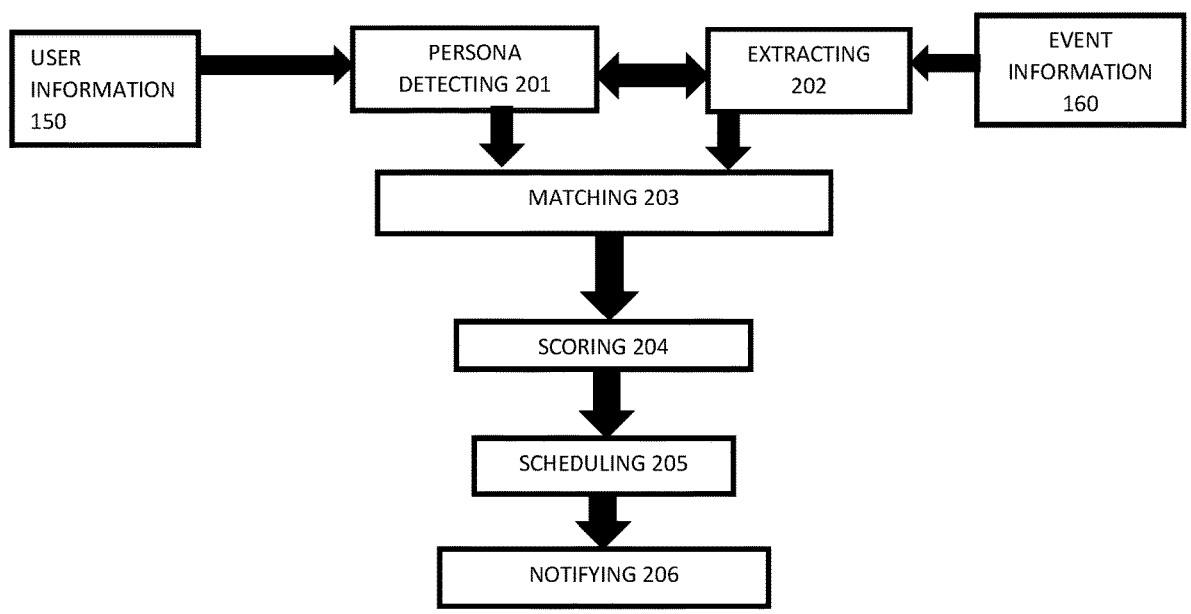
FIG. 2 exemplarily shows a high level flow chart for a personalized scheduling and networking method.

FIG. 2 shows a high level flow chart for a method 200 for a personalized scheduling and networking method.

Step 201 receives user information 150 and creates a user persona for an event that is specific to that particular event.

Step 202 receives event information 160 and extracts all information pertaining to the types of events, the list of participants, the dates, times, location of events, etc. That is, step 202 extracts all relevant information in order to create a schedule and network from the event information 160

Step 203 matches the user persona profile with events based on the extracted information and the user's interest.

Step 204 calculates a score for each sub-event, for example based on semantic similarity features derived from the user persona profile and the event information. Based on the score calculated by step 204, step 203 will match the user with a particular event having the highest score.

Step 205 creates a schedule for the user for the event based on the matches output from the matching device 103. That is, step 205 constructs a personalized schedule for the user, using scheduling and optimization techniques, where such schedule will respect explicit user's directions (e.g., the user wants to attend a certain talk) and will select a subset of sub-events that will maximize the sum of the scores and matches of step 203 and step 204 subject to the time and location constraints and calculate a schedule and route to attend the set of sub-events and display it to the user.

Step 206 notifies the user of the networking opportunities in advance as well as how to take advantage of contingent and contextual information to quickly organize networking opportunities. Step 206 notifies the users of networking opportunities based on a change in the scheduling and networking information such that the user is aware of new networking opportunities causes by last minute changes in the schedule.

It should be noted that the embodiments herein can be implemented on an App for devices which the App can be hosted by the host of the large expo or conference and the attendees can download the App.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the personalized scheduling and networking system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A non-transitory computer-readable recording medium recording a personalized scheduling and networking program, the computer readable program code configured to be executable by a processor to perform operations comprising:
   creating a user persona profile, via a persona detection mining device embodied in a cloud-computing environment, based on user information that is specific to a conference and based on manually entered user information at a time of registering for the conference;
   extracting, via an extraction device embodied in a cloud-computing environment, scheduling and networking information based on event information of the conference including a spatial identifier and a temporal identifier of each conference event of the conference and each participant according to an addressable location of each user device in a network at the conference;
   matching a user with conference events during the conference based on the extracted scheduling and networking information and the user persona profile, the matching filters out potential matches when a distance between the user and either the conference event or the participant is greater than a threshold as determined according to the spatial identifier;
   creating a schedule and a route for maximizing a number of the conference events and networking opportunities based on matches of the matching;
   updating the schedule and the route dynamically in a web browser based on an addressable location of a user device in the network at the conference, wherein the updated schedule pushes a notification in real-time to the user device caused by last minute changes in the schedule;
   sending the notification to the user device based on the addressable location of the user device by detecting proximity of the users within a conference area for networking events of the conference;

outputting a data file with the schedule and the route to the user device by updating website links to hyperlinks; and extracting and receiving the information via the hyperlinks on the user device, wherein the schedule and the route are dynamically changed based on real-time data of the user persona profile and mined data from the user persona profile according to the spatial identifier, the addressable location, and the temporal identifier, and wherein the matching further matches the user with a second user having similar networking information by detecting a free time in the schedule of the user that does not overlap with the conference events during the conference and a free time in the schedule of another user that does not overlap with conference events during the conference with similar networking information and scheduling a meetup during the free time that does not overlap with the conference events during the conference, the matching further checking the spatial identifier and the temporal identifier, wherein the schedule and the route are further dynamically changed to match the user with a different conference event in the schedule of the user based on a cancellation of the conference events during the conference, wherein the user inputs a constraint on the creation of the schedule to constrain an amount of time out of an event time for networking versus attending the events, and wherein the matching further matches the user with one of the conference events during the conference based on a current and an expected waiting time for attending the conference event, wherein, embodied in the cloud computing environment:
the persona detection mining device mines and gathers all of the user information from a plurality of social media sources and creates the user persona profile based on all available information that the user has stored in the plurality of social media sources by dynamically extracting keywords, likes, and dislikes of the social media sources; and the persona detection mining device creates the user data that is relevant to the specific context based on the event information extracted by the extraction device, thereby, creating a feed of streaming data between the persona detection mining device and the extraction device such that a specific context user persona is created for the event according to a dual analysis of the event and the plurality of social media sources.

2. The non-transitory computer-readable recording medium of claim 1, wherein the event information includes a map of the event along with schedules of the conference events, locations of the conference events, descriptions of the conference events, schedules of attendees, locations of the attendees as determined by the addressable location, and descriptions of the attendees.

3. The non-transitory computer-readable recording medium of claim 1, further comprising scoring each of the conference events based on semantic similarity features derived from the user persona profile and the event information, and
wherein the scoring scores each of the conference events such that the creating the schedule prioritizes scheduling the conference events with the greatest score, and
wherein the user updates the event information with a new event, further comprising notifying the users of networking opportunities based on a change in the scheduling and networking information.

4. The non-transitory computer-readable recording medium of claim 1, further comprising notifying the users of networking opportunities.

5. The non-transitory computer-readable recording medium of claim 4, wherein the notifying notifies the user of a spatial parameter between the user and the networking opportunities.

6. The non-transitory computer-readable recording medium of claim 1, further comprising notifying the users of networking opportunities based on a change in the scheduling and networking information.

7. The non-transitory computer-readable recording medium of claim 1, wherein the user updates the event information with a new event.

8. The non-transitory computer-readable recording medium of claim 1, wherein the route for attending the events is calculated for the user based on a current location of the user and in real-time.

9. A personalized scheduling and networking method, comprising:
creating a user persona profile, via a persona detection mining device embodied in a cloud-computing environment, based on user information that is specific to a conference and based on manually entered user information at a time of registering for the conference;

extracting, via an extraction device embodied in a cloud-computing environment, scheduling and networking information based on event information of the conference including a spatial identifier and a temporal identifier of each conference event of the conference and each participant according to an addressable location of each user device in a network at the conference;

matching a user with conference events during the conference based on the extracted scheduling and networking information and the user persona profile, the matching filters out potential matches when a distance between the user and either the conference event or the participant is greater than a threshold as determined according to the spatial identifier;

creating a schedule and a route for maximizing a number of the conference events and networking opportunities based on matches of the matching; and updating the schedule and the route dynamically in a web browser based on an addressable location of a user device in the network at the conference, wherein the updated schedule pushes a notification in real-time to the user device caused by last minute changes in the schedule;

sending the notification to the user device based on the addressable location of the user device by detecting proximity of the users within a conference area for networking events of the conference;

outputting a data file with the schedule and the route to the user device by updating website links to hyperlinks; and extracting and receiving the information via the hyperlinks on the user device, wherein the schedule and the route are dynamically changed based on real-time data of the user persona profile and mined data from the user persona profile according to the spatial identifier, the addressable location, and the temporal identifier, and wherein the matching further matches the user with a second user having similar networking information by detecting a free time in the schedule of the user that does not overlap with the conference events during the conference and a free time in the schedule of another user that does not overlap with conference events during the conference with similar networking information and scheduling a meetup during the free time that does not overlap with the conference events during the conference, the matching further checking the spatial identifier and the temporal identifier, wherein the schedule and the route are further dynamically changed to match the user with a different conference event in the schedule of the user based on a cancellation of the conference events during the conference, wherein the user inputs a constraint on the creation of the schedule to constrain an amount of time out of an event time for networking versus attending the events, and wherein the matching further matches the user with one of the conference events during the conference based on a current and an expected waiting time for attending the conference event, wherein, embodied in the cloud computing environment:
the persona detection mining device mines and gathers all of the user information from a plurality of social media sources and creates the user persona profile based on all available information that the user has stored in the plurality of social media sources by dynamically extracting keywords, likes, and dislikes of the social media sources; and the persona detection mining device creates the user data that is relevant to the specific context based on the event information extracted by the extraction device, thereby, creating a feed of streaming data between the persona detection mining device and the extraction device such that a specific context user persona is created for the event according to a dual analysis of the event and the plurality of social media sources.

10. The method of claim 9, wherein the event information includes a map of the event along with schedules of the conference events, locations of the conference events, descriptions of the conference events, schedules of attendees, locations of the attendees, and descriptions of the attendees.

11. The method of claim 9, further comprising scoring each of the conference events based on semantic similarity features derived from the user persona profile and the event information.

12. The method of claim 11, wherein the scoring scores each of the conference events such that the creating the schedule prioritizes scheduling the conference events with the greatest score.

13. The method of claim 9, further comprising notifying the users of networking opportunities.

14. The method of claim 9, further comprising notifying the users of networking opportunities based on a change in the scheduling and networking information.

15. The method of claim 14, wherein the notifying notifies the user of a spatial parameter between the user and the networking opportunities.

16. The method of claim 9, wherein the route for attending the events is calculated for the user based on a current location of the user and in real-time.

17. A personalized scheduling and networking system, comprising:
a processor, and
a memory, the memory storing instructions to cause the processor to:
creating a user persona profile, via a persona detection mining device embodied in a cloud-computing environment, based on user information that is specific to a conference and based on manually entered user information at a time of registering for the conference;

extracting, via an extraction device embodied in a cloud-computing environment, scheduling and networking information based on event information of the conference including a spatial identifier and a temporal identifier of each conference event of the conference and each participant according to an addressable location of each user device in a network at the conference;

matching a user with conference events during the conference based on the extracted scheduling and networking information and the user persona profile, the matching filters out potential matches when a distance between the user and either the conference event or the participant is greater than a threshold as determined according to the spatial identifier;

creating a schedule and a route for maximizing a number of the conference events and networking opportunities based on matches of the matching; and updating the schedule and the route dynamically in a web browser based on an addressable location of a user device in the network at the conference, wherein the updated schedule pushes a notification in real-time to the user device caused by last minute changes in the schedule;

sending the notification to the user device based on the addressable location of the user device by detecting proximity of the users within a conference area for network events of the conference;

outputting a data file with the schedule and the route to the user device by updating website links to hyperlinks; and extracting and receiving the information via the hyperlinks on the user device, wherein the schedule and the route are dynamically changed based on real-time data of the user persona profile and mined data from the user persona profile according to the spatial identifier, the addressable location, and the temporal identifier, and wherein the matching further matches the user with a second user having similar networking information by detecting a free time in the schedule of the user that does not overlap with the conference events during the conference and a free time in the schedule of another user that does not overlap with conference events during the conference with similar networking information and scheduling a meetup during the free time that does not overlap with the conference events during the conference, the matching further checking the spatial identifier and the temporal identifier, wherein the schedule and the route are further dynamically changed to match the user with a different conference event in the schedule of the user based on a cancellation of the conference events during the conference, wherein the user inputs a constraint on the creation of the schedule to constrain an amount of time out of an event time for networking versus attending the events, and wherein the matching further matches the user with one of the conference events during the conference based on a current and an expected waiting time for attending the conference event, wherein, embodied in the cloud computing environment:
the persona detection mining device mines and gathers all of the user information from a plurality of social media sources and creates the user persona profile based on all available information that the user has stored in the plurality of social media sources by dynamically extracting keywords, likes, and dislikes of the social media sources; and the persona detection mining device creates the user data that is relevant to the specific context based on the event information extracted by the extraction device, thereby, creating a feed of streaming data between the persona detection mining device and the extraction device such that a specific context user persona is created for the event according to a dual analysis of the event and the plurality of social media sources.

18. The system of claim 17, wherein the free time in the schedule of the user is detected based on the temporal identifier.

19. The system of claim 17, wherein the event information includes each sub-event.

\* \* \* \* \*